(12) United States Patent
Marcus et al.

(10) Patent No.: US 8,960,947 B2
(45) Date of Patent: Feb. 24, 2015

(54) LIGHTING APPARATUS

(75) Inventors: Brian Marcus, New York, NY (US); John Solano, Reseda, CA (US); Russell Abelein, Hauppauge, NY (US); Steven Tiffen, Hauppauge, NY (US); Duane Sherwood, Hauppauge, NY (US)

(73) Assignee: The Tiffen Company, LLC, Hauppauge, NY (US)

( * ) Notice: Subject to any disclaimer, the term of this patent is extended or adjusted under 35 U.S.C. 154(b) by 161 days.

(21) Appl. No.: 13/578,524

(22) PCT Filed: Mar. 4, 2011

(86) PCT No.: PCT/US2011/027115
§ 371 (c)(1),
(2), (4) Date: Jan. 11, 2013

(87) PCT Pub. No.: WO2011/109673
PCT Pub. Date: Sep. 9, 2011

(65) Prior Publication Data
US 2013/0201671 A1 Aug. 8, 2013

Related U.S. Application Data

(60) Provisional application No. 61/310,968, filed on Mar. 5, 2010.

(51) Int. Cl.
| | |
|---|---|
| *F21S 10/00* | (2006.01) |
| *F21L 4/00* | (2006.01) |
| *F21V 19/02* | (2006.01) |
| *F21V 21/40* | (2006.01) |
| *G03B 15/02* | (2006.01) |
| *G03B 15/03* | (2006.01) |
| *G03B 15/04* | (2006.01) |

(52) U.S. Cl.
CPC . *F21S 10/00* (2013.01); *F21L 4/00* (2013.01); *F21V 19/02* (2013.01); *F21V 21/406* (2013.01); *G03B 15/02* (2013.01); *G03B 15/03* (2013.01); *G03B 15/0484* (2013.01); *G03B 2215/0517* (2013.01)
USPC .............. 362/187; 362/18; 362/109; 362/208

(58) Field of Classification Search
USPC ...................... 362/17, 18, 187–208, 109, 157
See application file for complete search history.

(56) References Cited

U.S. PATENT DOCUMENTS

| | | |
|---|---|---|
| 2,109,056 A | 2/1938 | Bardwell |
| 4,179,726 A | 12/1979 | Aron |
| 4,777,566 A * | 10/1988 | Lowell et al. ..................... 362/3 |

(Continued)

OTHER PUBLICATIONS

International Search Report and Written Opinion dated Mar. 4, 2011 in related International Application No. PCT/US2011/027115.

*Primary Examiner* — Bao Q Truong
(74) *Attorney, Agent, or Firm* — Schnader Harrison Segal & Lewis LLP

(57) ABSTRACT

A portable, handheld lighting apparatus having a light intensity control component, a focus control component, and a light source accommodation component. The lighting apparatus is configured to be handheld with a single hand wherein the light intensity control component and the focus control components are accessible with the single hand to hold the apparatus. The lighting apparatus may be part of a kit that contains one or more of the following: various light modifying components, a power source, charger and various light sources.

18 Claims, 3 Drawing Sheets

(56) References Cited

U.S. PATENT DOCUMENTS

| | | | |
|---|---|---|---|
| 5,093,763 A | 3/1992 | Vanderschuit | |
| 5,158,358 A | 10/1992 | Maglica | |
| 5,171,086 A | 12/1992 | Baloochi | |
| 5,371,655 A * | 12/1994 | Murdock et al. | 362/18 |
| 5,526,076 A | 6/1996 | Walker | |
| 5,746,495 A | 5/1998 | Klamm | |
| 6,305,818 B1 * | 10/2001 | Lebens et al. | 362/184 |
| 6,841,941 B2 | 1/2005 | Kim | |
| 7,163,312 B2 * | 1/2007 | Woodyard | 362/183 |
| 2003/0035286 A1 * | 2/2003 | Parker et al. | 362/205 |
| 2003/0215766 A1 | 11/2003 | Fischer | |
| 2005/0128741 A1 | 6/2005 | Matthews | |
| 2007/0159815 A1 | 7/2007 | Bayat | |
| 2008/0136334 A1 | 6/2008 | Robinson | |
| 2010/0046211 A1 * | 2/2010 | Spartano et al. | 362/157 |

* cited by examiner

LIGHTING APPARATUS

This application is based on, and claims priority to, U.S. Provisional Application, Ser. No. 61/310,968, filed Mar. 5, 2010, entitled Lighting Apparatus.

BACKGROUND OF THE INVENTION

Photography and videography often require artificial light in addition to or instead of natural light. Both free-standing lighting devices and those that attach to cameras are known in the art. Although lighting devices exist that are portable and are suitable for use by photographers and videographers, to the best of the inventors' knowledge a handheld device that is wireless and does not require a support system or attach to a camera does not exist in the art. (The term "photography" and "photographer" will be used herein to include "videography and videographer" for simplification.)

Wireless, handheld lights exist, such as flashlights, but the general configuration is not suitable for photography purposes. This is because they are either lacking in the necessary capabilities, such as providing a variety of types of lighting, or are not configured to direct light in the desired direction, while being comfortable to operate.

SUMMARY

A lighting apparatus is disclosed that comprises, in an illustrative embodiment, a light intensity control component, a focus control component, and a light source accommodation component. The lighting apparatus is preferably configured to be handheld with a single hand wherein the light intensity control component and the focus control components are accessible with the same hand used to hold the apparatus. The lighting apparatus is configured to have a power source integral with or attached to it. Various light modifying components can be attached to the lighting apparatus, and may be configured to be interchangeably held by a securing mechanism. The lighting apparatus may be part of a kit that contains one or more of the following: various light modifying components, a power source, charger and various light sources.

DESCRIPTION OF THE DRAWINGS

Illustrative embodiments of the invention are best understood from the following detailed description when read with the accompanying drawings.

DETAILED DESCRIPTION OF THE INVENTION

Figure 1B:
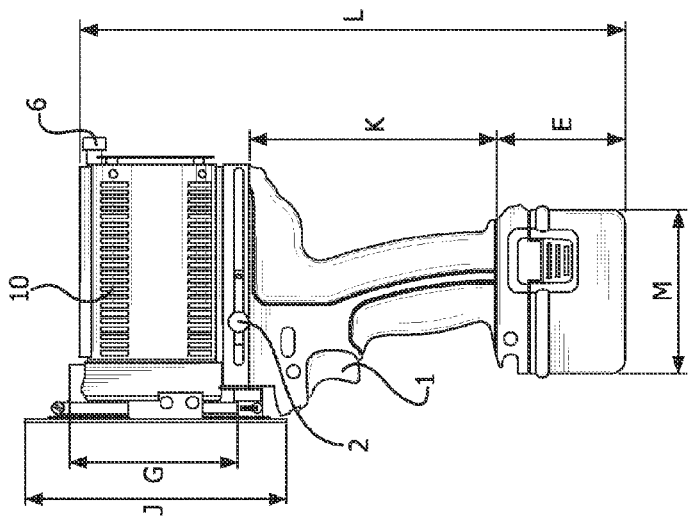
FIGS. 1A and 1B depict front and side views of a lighting apparatus according to an illustrative embodiment of the invention.

The invention, generally referred to herein as a "light gun," is a portable lighting solution, particularly applicable to professional image makers. The light gun is a lighting tool developed to assist professional photographers with its portability and high quality light. Embodiments of the invention can also be suitable for amateur photographers and videographers. When combined, for example, with the high iso capability of digital charge-coupled devices (CCDs) in devices such as professional SLRs, digital cameras, high-definition video cameras, the light gun may allow image makers to achieve optimal quality while on the go. Higher sensitivity digital chips, such as CCDs, allow the use of lower light levels to produce viable images. Thus, a lower power handheld light can become a very versatile tool. Although embodiments of the light gun can be useful with devices containing CCDs, it can also lend itself to use with other devices.

In an illustrative embodiment of the invention, the light gun can be operated using a single hand. This includes operation of various controls on the light gun such as focus and intensity controls. An on/off switch may also be within reach of a single hand or positioned elsewhere in the light gun. In a particular embodiment of the invention, the controls can be designed and positioned for comfortable use by either the left or right hand. This can be accomplished for example by having controls either in the center line of the handle for access by the user's finger(s) or by use of a slider, or similar mechanism that passes through the housing to be operated from either side by a user's finger(s).

In an exemplary embodiment of the invention, the light gun is powered by rechargeable batteries that last between about 30 minutes and one hour with constant use. This is merely an illustrative time range. Depending on the light intensity used, and various other factors that affect battery life, the battery life may be greater or less. In general, the lower the operating intensity, the longer the battery life.

Preferably, the battery is positioned below or near the bottom of the handle portion of the light gun. The light is preferably positioned above the handle. This configuration allows the battery to act as a counter balance to the light. In general, components of the light gun are best distributed to achieve a substantially balanced apparatus so the center of gravity is at or near the handle. The intent is to minimize the force necessary to hold the light in a desired position, making it easier for the device to be used, and possibly minimizing or reducing user fatigue. Weighted components or weight position adjustments can be included to vary the center of gravity position.

For many applications the handle should not be disposed parallel to the beam of light, such as in a flashlight or traditional search light. The handle may be disposed about perpendicular to the direction of the light beam or at a relatively small angle to the normal to the light beam or battery centerline. An illustrative handle position range is in a direction within about 15° of the normal in either direction of the light beam direction or lens line of focus, a further illustrative range is less than about 10°, and still further between about 5° and about 10°. The beam angle, however, can be adjustable in an exemplary embodiment of the invention. This is accomplished by a beam angle control component. For a lighting apparatus having an adjustable beam angle, the angle of the handle would of course vary from the ranges as beam angle adjustments were made. The desired handle angle can be based on the weight and positioning of the light source portion of the apparatus and the battery portion, to achieve the desired balance, which would generally be with the center of gravity being at the handle In an illustrative embodiment of the invention, the focusing system allows the light to focus from a spot to a flood light just by moving a dial, slider, or other comparable mechanism. The light output can also be controlled by such mechanisms. The dimmer function preferably follows a tapered dimming curve. A trigger or other suitable mechanism, provides an on/off function. The exposure changes based on the amount of light the light gun emits. A variable trigger mechanism can also be used to control functions of the light gun.

An optional aspherical lens can be used to change the shape and focus of the light from a narrow beam to a wide beam of light. The light shape and focus can also be changed with a Fresnel lens, for example. Other optical assemblies for adjusting the focus are within the scope of the invention.

The light gun may contain a mechanism to automatically shut off or limit power to the light source if the light reaches a particular temperature. The mechanism can contain for example, a temperature sensor, such as a thermocouple or thermistor, which provides data to a micro-controller. Based on the data, the micro-controller will control the light's output and/or whether it is on or off. The micro-controller can also, or instead, be functionally connected to an indicator light, or other warning device.

Figure 1A:
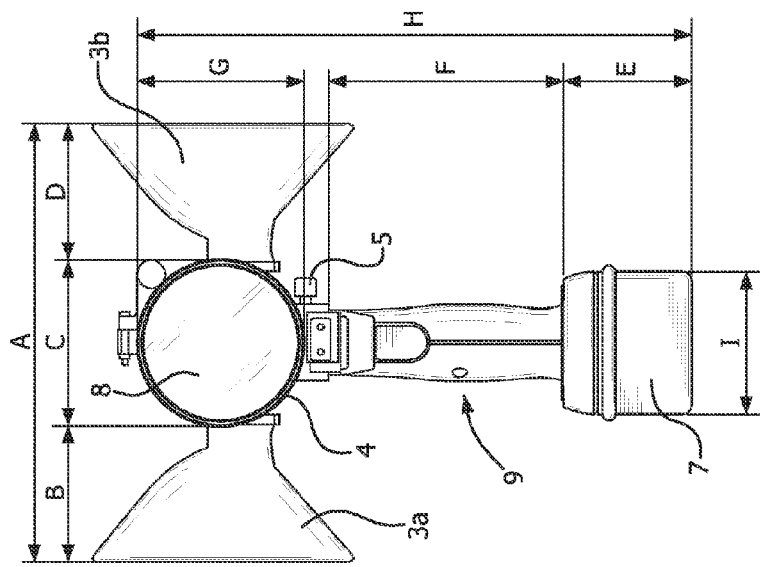
Figure 2:
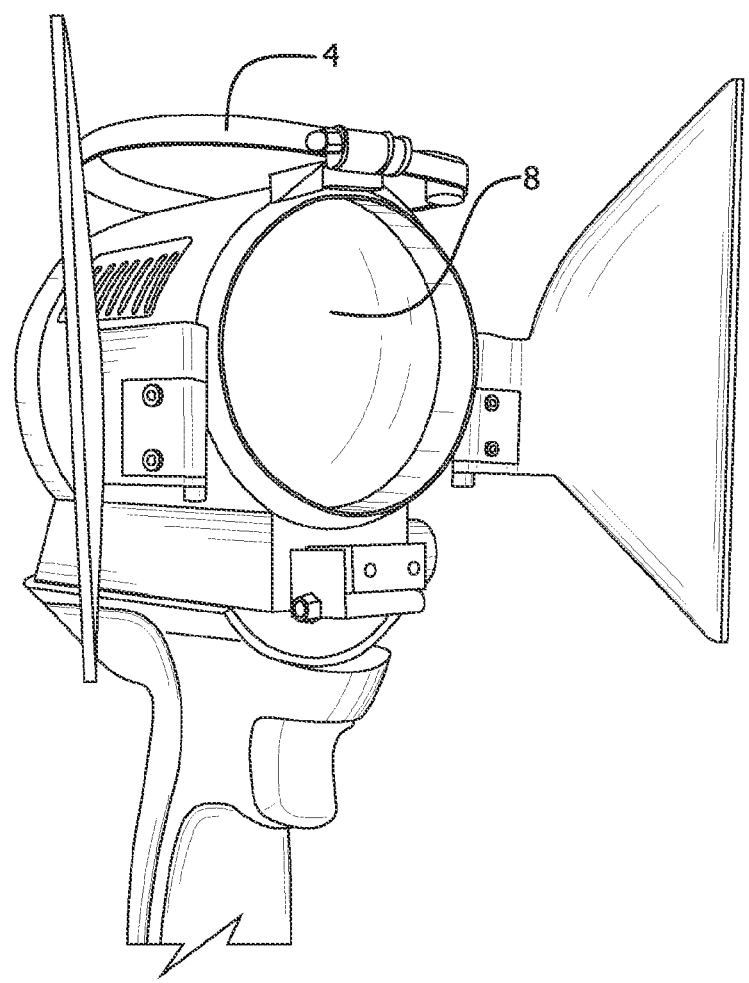
FIG. 2 depicts a perspective view of a portion of a lighting apparatus according to an illustrative embodiment of the invention.
Figure 3:
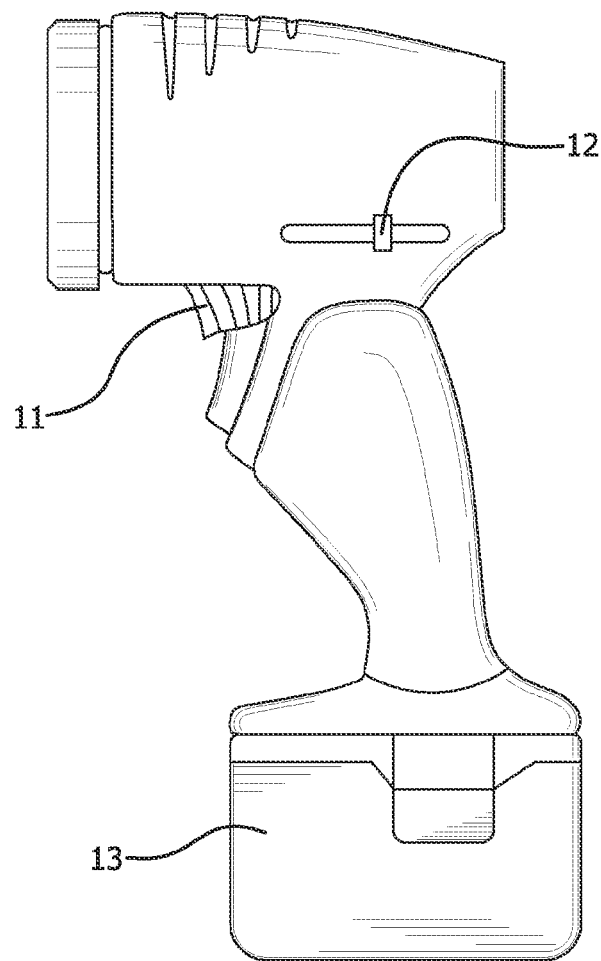
FIG. 3 depicts a lighting apparatus according to a further illustrative embodiment of the invention.

FIGS. 1A, 1B and 2 depict an illustrative embodiment of the invention in which the following features can be seen:
trigger 1 and slide 2 to adjust light characteristics (see analogous features 11 and 12 in FIG. 3)
barn doors 3a, 3b
ring 4 to secure a diffuser or other accessory, which can swing down in front of the light beam;
knob 5 to adjust and lock or provide sufficient tension to secure the position of the lamp carriage, which changes the beam angle of the light
knob 6 at the rear of the light to attach the rear access panel, which, when opened, allows the lamp carriage to be removed for lamp replacement
battery housing 7 (see analogous feature 13 in FIG. 3)
indicator light, to indicate when the battery is low for example
lens 8
dual material handle 9 for a combination of structure and ease of gripping
ergonomic handle shape for hand comfort
ventilation 10 for passive cooling of light source.

Embodiments of the invention preferably provide a high quality portable light that generates sellable quality photos with little or no set up and/or time.

In an exemplary embodiment of the invention, the light gun is handheld and fully or substantially contained with no external wires, cords or other apparatus. Preferably the light gun is portable and powerful enough to light up a wide variety of subjects at the proper exposure the cameras are capturing. The light gun can allow for custom angles and position of lighting to subject. It includes the ability to control diming and focus.

The light gun may include one or more light emitting diodes (LEDs), or other light source or sources, preferably mounted to a heat sink. This can be a modular component to allow replacement of LEDs, such as to change color or replace a poorly or non-functioning LED. The light source(s) generally are disposed in a light source accommodation component, which secures the light source to the apparatus and provides power to it.

A light blocking device may be incorporated into the light gun. The device may be used for example, to focus the light, to control spill light by blocking light in one or more directions, to feather the light, or to modify the shape of the light beam, such as by creating a strips of light. In an exemplary embodiment of the invention, the light blocking component comprises two or more barn doors, with two typically being preferred.

The light gun may include the potential to incorporate various light modifying accessories, such as filters, snoots, diffusers and scrims. Standard industry mechanisms may be used to mount accessories, such as threaded components; or other mechanisms such as a ring to secure an accessory that can swing down in front of the light beam or a holder having hooks to secure an accessory in place. In a particular embodiment, a holder is provided that can either be integral with the light gun or detachable. The holder can have, for example, a plurality of hooks to hold an accessory in place, wherein at least one hook can be moved, removed, rotated or otherwise unlocked to allow insertion or removal of accessories, and to secure them in place. This latter hook may be for example, spring loaded, so that when the spring is depressed the hook can be rotated out of the way to insert or remove accessories, and then swung back in place to secure accessories. Hooks can be for example, metal or plastic. Other securing mechanisms may also be used.

The light gun may have some or all of the following features:
variable focus and beam angle
consistency of the beam pattern
power source integral with or attached to the apparatus allowing the tool to be 100% mobile
focusable light capability
on/off trigger or other switching mechanism
knob, slider, or other control mechanism to adjust light intensity
light can be changed from a flood to a spot within minimal time
barn doors for light control
accessory compatibility through accessory mounting system
Fresnel lens
a separate dimmer knob or slider (see for example FIG. 3)
monolithic LED as a substantially point light source
plurality of LEDs
heat sink as an integral part of the housing
rechargeable batteries, for example 12v, 14.4v or 18v
battery charger
strap
50-120 w tungsten halogen light bulb
reversed polarity protection, such as a thyristor
mechanism to allow automatic shut off of power to the light source if it reaches a particular temperature
35 or 54 watt hour
DC jack to plug in apparatus
ventilation for passive air flow/convection cooling of light source
indicator light for battery light, over temperature, or other functions
custom dimming curve to create a substantially visually linear dimming gradation.

Illustrative measurements of the light gun are as follows, with the letters referring to FIGS. 1A and 1B.
A—approximately 9¼ inches
B—approximately 2⅞ inches
C—approximately 3½ inches
D—approximately 2⅞ inches
E—approximately 2¾ inches
F—approximately 5 inches
G—approximately 3½ inches
H—approximately 11¾ inches
I—approximately 3 inches
J—approximately 5½ inches
K—approximately 5¼ inches
L—approximately 11½ inches
M—approximately 3½ inches These measurements are illustrative only. Proportional measurements would also be suitable, or other combinations of measurements that preferably balance the apparatus appropriately to maximize an operator's ease of use.

Various embodiments of the invention have been described, each having a different combination of elements.

The invention is not limited to the specific embodiments disclosed, and may include different combinations of the elements disclosed and their equivalents.

While the invention has been described by illustrative embodiments, additional advantages and modifications will occur to those skilled in the art. Therefore, the invention in its broader aspects is not limited to specific details shown and described herein. Modifications may be made without departing from the spirit and scope of the invention. Accordingly, it is intended that the invention not be limited to the specific illustrative embodiments, but be interpreted within the full spirit and scope of the appended claims and their equivalents.

What is claimed is:

1. A lighting apparatus comprising:
    a housing having a handle portion:
    a light intensity control component;
    a focus control component; and
    a light source accommodation component;
    wherein the lighting apparatus is configured to be handheld with a single hand and wherein the light intensity control component and the focus control components are disposed on the housing so that when the handle portion is gripped by a user's hand, the user's fingers of that same hand are within reach of both the light intensity control component and the focus control components; and
    wherein the lighting apparatus is configured to have a power source integral with or attached to the handle portion.

2. The lighting apparatus of claim 1 further comprising a beam angle control component.

3. The lighting apparatus of claim 1 further comprising:
    an accessory mounting system configured to mount light modifying components to the lighting apparatus.

4. The lighting apparatus of claim 1 wherein the apparatus, including, the light intensity control component and the focus control component is configured for the single hand to be either a user's right or left hand.

5. The lighting apparatus of claim 1 further comprising an adjustable light blocking component.

6. The lighting apparatus of claim 5 wherein the adjustable light blocking component comprises two or more barn doors.

7. The lighting apparatus of claim 1 wherein the power source is positioned below the handle and the handle is disposed in a direction within 15° of the normal to the light beam direction.

8. The lighting apparatus of claim 1 wherein the power supply is positioned below the handle and the handle is disposed in a direction between 5°-10° of the normal to the light beam direction.

9. The lighting apparatus of claim 1 wherein the center of gravity of the apparatus is at or near the handle.

10. The lighting apparatus of claim 1 wherein the light beam is focusable from a spot light to a flood light.

11. The lighting apparatus of claim 1 wherein the light source is a light emitting diode.

12. The lighting apparatus of claim 1 wherein the light source accommodation component contains it plurality of light emitting diodes, and the apparatus includes a light source adjustment component to activate all of the light emitting diodes or one or more portions of the light emitting diodes.

13. The lighting apparatus of claim 1 wherein the light intensity component creates a dimmer function that follows a tapered dimming curve.

14. The lighting apparatus of claim 1 wherein the light intensity component creates a dimmer function having a linear gradation.

15. The lighting apparatus of claim 1 comprising an aspherical lens.

16. The lighting apparatus of claim 1 further comprising, a Fresnel lens.

17. A kit comprising a lighting apparatus according to claim 1 and;
    a power source;
    a recharger; and
    a plurality of light modifying components.

18. A lighting apparatus comprising:
    a housing having a handle portion;
    at least one light source capable of producing a light beam;
    wherein the handle is disposed in a direction within 15° of the normal to the light beam direction;
    a light source accommodation component, wherein the at least one light source is removably received within the light source accommodation component;
    a light intensity trigger control component functionally connected to at least one light source to dim the at least one light source, wherein the light intensity trigger control component is positioned along the handle portion's longitudinal center line so as to be accessible for control by a single hand and to be accessible by either the right or left hand;
    a focus control component functionally connected to at least one light source to focus the light beam from a spot light to a flood light;
    an automatic shut-off component;
    wherein the power source is positionable below the handle; and
    wherein the at least one light source is a light emitting diode.

* * * * *